United States Patent [19]
Deberry

[11] Patent Number: 5,738,834
[45] Date of Patent: Apr. 14, 1998

US005738834A

[54] SYSTEM FOR REMOVAL OF HYDROGEN SULFIDE FROM A GAS STREAM

[75] Inventor: David W. Deberry, Austin, Tex.

[73] Assignee: Gas Research Institute, Chicago, Ill.

[21] Appl. No.: 835,140

[22] Filed: Apr. 4, 1997

Related U.S. Application Data

[62] Division of Ser. No. 711,122, Sep. 9, 1996.

[51] Int. Cl.$^6$ ............................ B01D 50/00; B01D 53/34
[52] U.S. Cl. ............................ 422/177; 55/223; 55/233; 55/238
[58] Field of Search ...................... 422/171, 177; 55/223, 233, 238; 95/235; 423/242.7, 245.1, 226

[56] References Cited

U.S. PATENT DOCUMENTS

| | | | |
|---|---|---|---|
| 3,767,766 | 10/1973 | Tjoa et al. | 423/220 |
| 3,956,473 | 5/1976 | Mimoun et al. | 423/573 R |
| 4,020,149 | 4/1977 | Bosniack | 423/575 |
| 4,097,250 | 6/1978 | Pagani et al. | 55/48 |
| 4,243,648 | 1/1981 | Fenton | 423/573 R |
| 4,289,738 | 9/1981 | Pearce et al. | 423/228 |
| 4,405,580 | 9/1983 | Stogryn et al. | 423/226 |
| 4,412,981 | 11/1983 | Kubicek | 423/573 R |
| 4,446,118 | 5/1984 | Nicksic | 423/226 |
| 4,483,833 | 11/1984 | Stogryn et al. | 423/228 |
| 4,537,752 | 8/1985 | Weber | 423/224 |
| 4,539,189 | 9/1985 | Starkston et al. | 252/189 |
| 4,545,965 | 10/1985 | Gazzi et al. | 423/229 |
| 4,548,620 | 10/1985 | Albiol | 55/48 |
| 4,622,212 | 11/1986 | McManus et al. | 423/226 |
| 4,647,397 | 3/1987 | Starkston et al. | 423/220 |
| 4,666,695 | 5/1987 | Baur et al. | 423/571 |
| 4,765,873 | 8/1988 | Chang et al. | 204/101 |
| 4,770,862 | 9/1988 | Chu et al. | 423/229 |
| 4,772,366 | 9/1988 | Winnick | 204/128 |
| 4,775,519 | 10/1988 | Yit Nieh | 423/226 |

(List continued on next page.)

FOREIGN PATENT DOCUMENTS 2079307  1/1982  United Kingdom.

OTHER PUBLICATIONS

Heisel, Michael, (Linde AG), "Operating Experiences with the Direct Oxidation Scrubber Using Sulfolin Liquor at Rheinbraun AG/Berrenrath," *Proceedings of the 1989 GRI Liquid Redox Sulfur Recovery Conference*, GRI–89/0206, Austin, TX, May 7–9, 1989, pp. 146–164.

(List continued on next page.)

*Primary Examiner*—Nina Bhat
*Attorney, Agent, or Firm*—Speckman Pauley Petersen & Fejer

[57] ABSTRACT

A system for removing hydrogen sulfide from a gaseous stream such as one of natural gas. A sour gas stream containing $H_2S$ is contacted with a nonaqueous, water-insoluble sorbing liquor which comprises an organic solvent for elemental sulfur, dissolved elemental sulfur, an organic base to promote the reactions, and an organic solubilizing agent an agent suitable for maintaining the solubility of polysulfide intermediates which may otherwise separate when they are formed during operation of the process. Hydrogen sulfide ($H_2S$) gas is sorbed into this liquor and then reacts with the dissolved sulfur in the presence of the base to form polysulfide molecules. The solution is then sent to a reactor where sufficient residence time is provided to allow the polysulfide forming reactions to reach the desired degree of completion. From the reactor, the solution flows to a regenerator where the solution is oxidized (e.g., by contact with air), forming dissolved elemental sulfur and water. The temperature of the solution is then lowered, forming sulfur crystals, which are easily removed by gravity settling, filtration, centrifuge, or other separation method. Enough sulfur remains dissolved in the solution following removal of the sulfur crystals that when this solution is reheated and returned to the absorber a sufficient amount of sulfur is present to react with the inlet $H_2S$ gas.

6 Claims, 1 Drawing Sheet

U.S. PATENT DOCUMENTS

| | | | |
|---|---|---|---|
| 4,976,935 | 12/1990 | Lynn | 423/222 |
| 5,102,635 | 4/1992 | Delaney et al. | 423/220 |
| 5,122,351 | 6/1992 | Hardison | 423/220 |
| 5,180,572 | 1/1993 | Plummer | 423/576.7 |
| 5,334,363 | 8/1994 | Plummer | 423/226 |
| 5,525,233 | 6/1996 | Falkiner et al. | 210/638 |
| 5,556,606 | 9/1996 | Khanmamedov | 423/228 |

OTHER PUBLICATIONS

Gowdy, Hugh W. and M.R. Anderson, (UNOCAL Science and Technology Division), "The Commercialization of the Unisulf Process," *Proceedings of the 1986 Stretford Users' Conference GRI 86/0256*, Austin, Texas, May 5–6, 1986, pp. 104–120.

Lynn, Scott, et al. (University of California, Berkeley), "UCB Sulfur–Recovery Process," *Proceedings of the 1991 GRI Sulfur Recovery Conference*, GRI 91/0188, Austin, Texas, May 5–7, 1991, pp. 169–180.

Plummer, Mark A. (Marathon Oil Company), "Hydrogen Sulfide Decomposition to Hydrogen and Sulfur," *Proceedings of the 1989 GRI Liquid Redox Sulfur Recovery Conference*, GRI 89/0206, Austin, Texas, May 7–9, 1989, pp. 344–361.

Clark, P.D., E.G. Fitzpatrick, and K.L. Lesage, "The $H_2S$/$H_2S$/Liquid Sulfur System: Application to Sulfur Degassing and Removing Low Levels of $H_2S$ from Sour Gas Streams," presented at the 1995 Spring National Meeting of the American Institute of Chemical Engineers, sulfur Removal from Gas Streams, Session 54, Mar. 19–23, 1995.

H. Krebs, E.F. Weber and H. Balters: *Darstellung und Eigenschaften von Wasserstoffpolysulfiden organischer Basen, Zeitschrift für anorganische und allgemeine Chemie*, Band 275, 1954, pp. 147–151.

H. Krebs and K.-H. Müller: Darstellung und Eigenschaften von Wasserstoffpolysulfiden organischer Basen II, *Zeitschrift für anorganische und allgemeine Chemie*, Band 281, 1955, pp. 187–189.

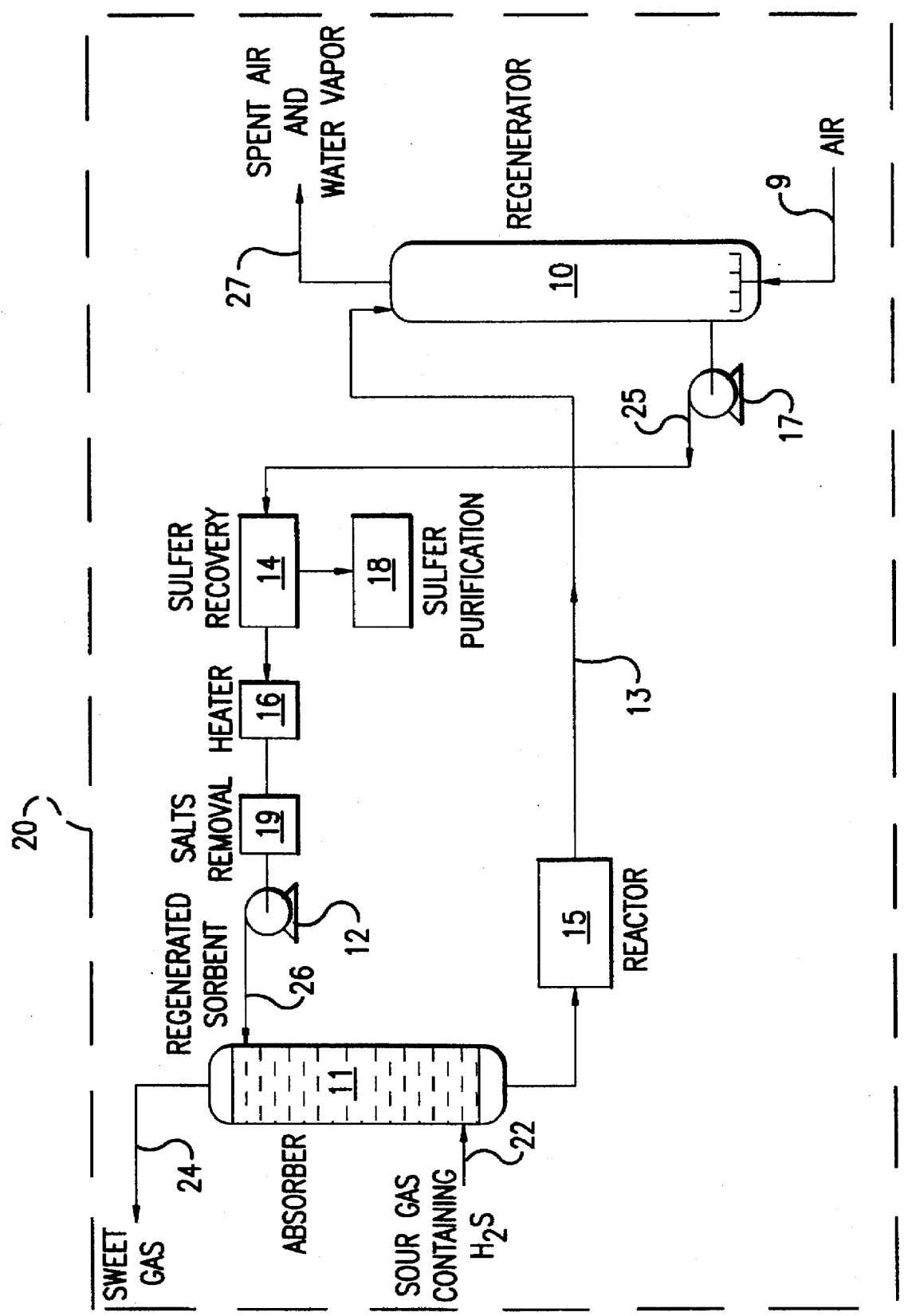

SYSTEM FOR REMOVAL OF HYDROGEN SULFIDE FROM A GAS STREAM

This is a divisional of copending application Ser. No. 08/711,122 filed on 9 Sep. 1996.

BACKGROUND OF THE INVENTION

1. Field of the Invention

This invention relates generally to processes and systems for removing hydrogen sulfide from a gaseous stream. More specifically the invention relates to a process and system for removal of hydrogen sulfide from a gaseous stream using as an oxidizing agent a nonaqueous scrubbing liquor in which are dissolved sulfur and a reaction-promoting base.

2. Description of Prior Art

The presence of hydrogen sulfide in fuel and other gas streams has long been of concern for both the users and the producers of such gas streams. In the instance, e.g., of natural gas, it may be noted that historically about 25% of the said gas produced in the United States has been sour, i.e., containing greater than 4 ppmv $H_2S$ (5.7 mg $H_2S/m^3$). Aside from the corrosive and other adverse effects that such impurities may have upon equipment and processes with which such gas streams interact, noxious emissions are commonly produced from combustion of the natural gas as a result of oxidation of the hydrogen sulfide. The resulting sulfur oxides are a major contributor to air pollution and may have detrimental impact upon humans, animals, and plant life. Increasingly stringent federal and state regulations have accordingly been promulgated in an effort to reduce or eliminate sulfurous emissions, and a concomitant interest exists in efficiently removing from natural gas streams and the like the hydrogen sulfide that comprises a significant precursor of the emissions.

Among the most widely used methodologies for removing hydrogen sulfide from gaseous streams is the so-called liquid redox sulfur recovery (LRSR) technology. In conventional LRSR processes a redox couple dissolved in a solvent (usually water) is used to scrub hydrogen sulfide from a gas stream and convert it to sulfur that is removed from the system. The redox agent is reduced by the hydrogen sulfide and is regenerated by contacting with air in a separate vessel. This technology dates back to at least the late 1950's in the United Kingdom with the introduction of a continuous process to react $H_2S$ to elemental sulfur using an aqueous solution of the sodium salts of the 2:6 and 2:7 isomers of anthraquinone disulphonic acid (ADA). The reaction rates for this original ADA process were very slow, resulting in large volumes of liquor and large reaction tanks. Later, it was learned that addition of sodium vanadate would increase the reaction rates and the Stretford process resulted. Further discussion of the latter is contained in U.S. Pat. No. 5,122,351. The Stretford process was a considerable improvement over the ADA-only process and more than 100 plants were built worldwide, many of which are still in operation.

Several limitations of Stretford and similar aqueous-based LRSR processes utilizing vanadium (e.g., Unisulf, Sulfolin) provided impetus for new technology. For some applications (often those with low levels of $CO_2$ in the feed gas) the extent of conversion of inlet $H_2S$ to sulfur salts (e.g., thiosulfate and sulfate) was such that large solution blowdown was required. For other applications (often those with high-$CO_2$ in the feed gas), the absorber experienced sulfur plugging and poor removal of $H_2S$. Environmental concerns related to vanadium discharges, especially in the U.S., provided additional opportunity for new technology to be developed and enter the marketplace. Pertinent generally to the Sulfolin process, see Heisel, Michael, (Linde AG), "Operating Experiences with the Direct Oxidation Scrubber Using Sulfolin Liquor at Rheinbraun AG/Berrenrath," *Proceedings of the 1989 GRI Liquid Redox Sulfur Recovery Conference*, GRI-89/0206, Austin, Tex., May 7–9, 1989, pp 146–164. Pertinent to the Unisulf process, see Gowdy, Hugh W. and M. R. Anderson (UNOCAL Science and Technology Division), "The Commercialization of the Unisulf Process," *Proceedings of the 1986 Stretford Users' Conference*, GRI 86/0256, Austin, Tex., May 5–6, 1986, pp 104–120.

Over the past decade the commercial marketplace has been dominated by aqueous-based technology in which aqueous polyvalent metal chelates are used as the redox solution, with iron being the most common metal used. In U.S. Pat. No. 4,622,212, McManus et. al. provide a summary of the technology area and this patent along with its cited U.S. and foreign patent documents are incorporated herein by reference.

More than 100 liquid redox plants of the aqueous chelated polyvalent metal type have been built over the last ten years, and numerous patents have issued pertaining to enhancements for this basic approach to LRSR technology. However, there are several fundamental disadvantages of the aqueous-based, polyvalent metal chelate approach to LRSR technology that have generally limited the success of LRSR technology. One of the more serious of these is that the said aqueous-based, polyvalent metal chelate approach tends to convert $H_2S$ to solid sulfur in the absorber, contributing to foaming and plugging in the absorber and downstream equipment. This condition is especially disadvantageous in situations where the feed gas is to be treated at high pressure (e.g., greater than 600 psi). Due to the very small solubility of elemental sulfur in water, some solid elemental sulfur exists in all liquid streams, even the stream of regenerated scrubbing liquor returning to the absorber. As a result, sulfur deposition can occur throughout the system, which results in poor operability and reliability. In addition, having solid sulfur in all liquid streams means that liquid pumps must operate on aqueous slurries of water and sulfur. This condition leads to excessive pump wear and maintenance, especially for high-pressure plants.

Furthermore, the byproduct sulfur salts of sulfate and thiosulfate formed in the aqueous-based, polyvalent metal chelate approach to LRSR technology are soluble in these aqueous systems and cannot be easily removed, requiring expensive purges of valuable solution components and/or undesirable contamination of the product sulfur or sulfur cake.

Additionally, sulfur particles formed in these aqueous systems tend to be of small unit particle size (often less than 5 microns) and are difficult to separate by gravity, filtration, or other means due to its small particle size and its presence in an aqueous mixture. Surfactants and other additives must also be introduced into the process and maintained to attempt to induce the sulfur particles in this aqueous environment to float or sink, depending on the process, and to reduce foaming and plugging. Additionally iron or other metal ions must be added to the solution and maintained in the solution to react with the inlet $H_2S$; and expensive chelants must be added to the solution and maintained at levels sufficient to keep the metal ion(s) in solution. These chelants are susceptible to attack by free radicals and other species, resulting in degradation rates which are often too high.

A still further difficulty arising in the aqueous-based, polyvalent metal chelate LRSR technology is that sulfur cake produced by filtering, or centrifuging the sulfur particles from the aqueous stream will contain significant quantities of moisture (30 to 60 wt. %) and will be contaminated with solution components, even after washing.

As a result of these problems, the current state of the an of liquid redox sulfur recovery technology is that for low pressure gas streams (e.g., less than 600 psi) the current technologies can be made to operate, but costs are often higher than desired and operability and reliability are often less than desired. For high-pressure applications (e.g., greater than 600 psi), the operability and reliability of these processes are not adequate to be considered practical.

It has been known for some time that nonaqueous systems may produce sulfur with superior handling properties. However, limitations associated with reaction rates and product conversions have heretofore prevented implementation of a practical nonaqueous approach to LRSR technology. Because of the desirability of forming and handling sulfur in a nonaqueous system, several nonaqueous processes have indeed been proposed to date. For example, the UCB Sulfur-Recovery Process (UCB) proposes a nonaqueous system wherein hydrogen sulfide gas is absorbed in a solvent having a good solvent power for $H_2S$ and a much greater solvent power for sulfur dioxide ($SO_2$), for example, a polyglycol ether. This process is essentially a liquid phase version of the (gas phase) Claus reaction. The initial reaction is in the liquid phase and is between $H_2S$ and $SO_2$. One of the key control issues is to maintain the correct ratio of $SO_2$ to $H_2S$ in the reaction zone, as is the case with the Claus process. Water is soluble in the solvents proposed for this system. The UCB process requires the use of equipment to melt the sulfur, a furnace and boiler to react the sulfur with oxygen to form $SO_2$, an $SO_2$ scrubber to dissolve that $SO_2$ in the solution for recycle to the reactor/crystallizer, a solvent stripper to recover lean solvent, a sour water stripper, and other components. See Lynn, Scott, et. al. (University of California, Berkeley), "UCB Sulfur-Recovery Process," *Proceedings of the* 1991 *GRI Sulfur Recovery Conference*, GRI 91/0188, Austin, Tex., May 5–7, 1991, pp 169–180; and Lynn, U.S. Pat. No. 4,976,935.

Another proposed nonaqueous approach is the HYSULF process of Marathon Oil Company. This process utilizes the solvent n-methyl-2-pyrrolidinone (NMP) to react with $H_2S$ to form a quaternary ion complex, which in turn reacts with an anthraquinone to form sulfur and anthrahydroquinone. The anthrahydroquinone is then passed through a catalytic reactor to form anthraquinone for recycle and byproduct hydrogen gas. Further details of this process appear in Plummer, Mark A. (Marathon Oil Company), "Hydrogen Sulfide Decomposition to Hydrogen and Sulfur," *Proceedings of the* 1989 *GRI Liquid Redox Sulfur Recovery Conference*. GRI 89/0206, Austin, Tex., May 7–9, 1989, pp 344–361; and in Plummer, U.S. Pat. Nos. 5,334,363, and 5,180,572.

A process which utilizes molten sulfur to react with $H_2S$ has also been described by Peter Clark of Alberta Sulfur Research Ltd. (termed "ASR" process here). In this paper a system for removing $H_2S$ from natural gas containing from 10 to 1000 ppm $H_2S$ is described wherein the gas stream is sparged into a vessel containing molten sulfur at temperatures between 130° C. and 150° C. While this process does involve an initial reaction between sulfur and $H_2S$ in the absorber section, the process conditions, operations and chemistry of the ASR processes is very different from the invention described here, which we have termed the "CrystaSulf™" process. The ASR process thus operates around 140° C., versus 50° C. to 70° C. for CrystaSulf, so sulfur in the circulating streams is in the molten state and has molecular structure, physical properties, chemical properties, and performance characteristics of such state, as well as the consequent reaction pathways and reaction rates. Among other things, it may be noted that the $H_2S$ capacity of ASR's molten sulfur is likely to be equilibrium limited, and is evidently much lower than CrystaSulf. The ASR literature indicates a 1000 ppm upper limit for inlet $H_2S$ concentration. Furthermore, in the ASR process the molten sulfur circulating fluid will solidify if it cools much below the target operating range of 130° C. to 150° C., causing major operational problems. Further details of the ASR process can be found in Clark, P. D., E. G. Fitzpatrick, and K. L. Lesage, "The $H_2S/H_2S_x$/Liquid Sulfur System: Application to Sulfur Degassing and Removing Low Levels of $H_2S$ from Sour Gas Streams," presented at the 1995 Spring National Meeting of the American Institute of Chemical Engineers, Sulfur Removal from Gas Streams, Session 54, Mar. 19–23, 1995.

SUMMARY OF INVENTION

Now in accordance with the present invention, the foregoing inadequacies of the prior art LRSR technology are overcome by use of a nonaqueous solvent approach, which yields surprising and unexpected benefits. Pursuant to the invention, a sour gas stream containing $H_2S$ is contacted with a nonaqueous sorbing liquor which comprises an organic solvent for elemental sulfur, dissolved elemental sulfur, an organic base which drives the reaction converting $H_2S$ sorbed by the liquor to a nonvolatile polysulfide which is soluble in the sorbing liquor, and an organic solubilizing agent which prevents the formation of polysulfide oil-which can tend to separate into a separate viscous liquid layer if allowed to form. The sorbing liquor is preferably water insoluble as this offers advantages where water soluble salts are desired to be removed. Hydrogen sulfide ($H_2S$) gas is sorbed into this sorbing liquor where it reacts with the dissolved sulfur in the presence of the base to form polysulfide molecules. This reaction decreases the equilibrium vapor pressure of $H_2S$ over the solution, thus providing more efficient scrubbing than a physical solvent. The liquor is then sent to a reactor where sufficient residence time is provided to allow the polysulfide forming reactions to reach the desired degree of completion-i.e., resulting in a nonvolatile polysulfide which is soluble in the sorbing liquor. From the reactor, the liquor flows to a regenerator where the solution is oxidized (e.g., by contact with air), forming dissolved elemental sulfur and water (which, being insoluble, is rejected from the solution either as an insoluble liquid layer or as water vapor exiting the overhead of the regenerator or absorber). The temperature of the liquor, which up to this point is sufficient to maintain the sulfur in solution, is then lowered, forming sulfur crystals, which are easily removed by gravity settling, filtration, centrifuge, or other standard removal method. Enough sulfur remains dissolved in the liquor following separation of the sulfur crystals that when this solution is reheated and returned to the absorber for recycling in the process, a sufficient amount of sulfur is present to react with the inlet $H_2S$ gas.

The process and system for removal of hydrogen sulfide from a gaseous stream in accordance with this invention thus utilizes a nonaqueous sorbent liquor comprising a solvent having a high solubility for elemental sulfur, and a sufficient temperature so that solid sulfur formation does not occur either in the hydrogen sulfide absorber or in the air-sparged regenerator of the system utilized for carrying out the process. In accordance with the invention, the solvent generally can have a solubility for sulfur in the range of from about 0.05 to 2.5, and in some instances as high as 3.0 g-moles of sulfur per liter of solution. The temperature of the nonaqueous solvent material is preferably in the range of about 15° C. to 70° C. Sulfur formation is obtained, when desired, by cooling the liquor proceeding from the air-sparged regenerator. This can for example be effected at a sulfur recovery station by cooling means present at the station. The solvent is thereby cooled to a sufficiently low temperature to crystallize enough solid sulfur to balance the amount of hydrogen sulfide absorbed in the absorber. The solubility of elemental sulfur increases with increasing temperature in many organic solvents. The rate of change of solubility with temperature is similar for many solvents, but the absolute solubility of sulfur varies greatly from solvent to solvent. The temperature change necessary to operate the process will vary primarily with the composition of the sorbent, the flow rate of sorbent, and the operating characteristics of the recovery station. For most applications, a temperature difference of 5° C. to 20° C. is appropriate as between the temperature of the solvent material at the absorber/reactor and temperature to which the said solvent is cooled at the sulfur recovery station; but the temperature difference can in some instances be as little as 3° C. or as much as 50° C. The nonaqueous solvent in accordance with one preferred embodiment of this invention comprises a solvent selected from the group consisting of 1, 2, 3, 4 tetrahydronaphthalene, N,N dimethylaniline, diphenyl ether, dibenzyl ether, terphenyls, diphenylethanes, alkylated polycyclic aromatics, and mixtures thereof.

In order to obtain a measurable conversion of sulfur and hydrogen sulfide to polysulfides, the base added to the solvent must be sufficiently strong and have sufficient concentration to drive the reaction of sulfur and hydrogen sulfide to form polysulfides. Most primary, secondary and tertiary amines are suitable bases for use in accordance with the process of this invention. More particularly, amines which comprise nitrogen connected to alkane groups, alkanol groups, benzyl groups, or hydrogen (but not to phenyl) are suitable for use in the process of this invention. It should be noted that while the solvent utilized in the process of this invention requires the addition of a base to promote the reaction of sulfur and hydrogen sulfide to form polysulfides, the base and the solvent may be the same compound.

In accordance with one preferred embodiment of this invention, the base may be a tertiary amine. We have found that polysulfide compounds formed in the presence of tertiary amines are much more easily converted to sulfur by air during the regeneration step than those formed from primary amines or secondary amines. In accordance with a particularly preferred embodiment of this invention, the base is selected from the group consisting of 2-(dibutylamino) ethanol, N-methyldicyclohexylamine, N-methyldiethanolamine, tributylamine, dodecyldimethylamine, tetradecyldimethylamine, hexadecyldimethylamine, diphenylguanidine, alkylaryl polyether alcohols, and mixtures thereof. The base is present at concentrations of about 0.01M to 2.0M. Of the bases cited, 2-(dibutylamino) ethanol and N-methyldicyclohexylamine are most preferred, and are preferably present at concentrations of about 0.5 to 1.0M.

The nonaqueous sorbing liquor, in addition to including a solvent having a high solubility for sulfur, and a base, comprises an agent suitable for maintaining the solubility of polysulfide intermediates which may otherwise separate when they are formed during operation of the process. Such solubilizing agent is preferably selected from the group consisting of benzyl alcohol, benzhydrol, 3-phenyl-1-propanol, tri(ethylene glycol), and mixtures thereof.

The major chemical reactions for the process of this invention are summarized as follows:

$H_2S$ scrubber: $H_2S(g)+4\ S(1)+Base(1) \rightarrow HBaseHS_5(1)$

Regenerator: $HBaseHS_5(1)+\frac{1}{2}O_2(g) \rightarrow 5\ S(1)+H_2O(g)+Base(1)$ Crystallizer: $S(1) \rightarrow S(s)$ Overall: $H_2S(g)+\frac{1}{2}O_2(g) \rightarrow S(s)+H_2O(g)$ In the foregoing equations, the dissolved species $HbaseHS_5(1)$ is thought to be a salt of the protonated amine and protonated polysulfide. It is to be understood that the nominal $S:H_2S$ stoichiometry and predominant polysulfide chain length can vary with the actual solvent, base employed and physical operating conditions, and that the actual elemental sulfur species is predominantly cyclic $S_8$.

By use of the invention all of the aforementioned difficulties inherent in the prior art are overcome. Solid sulfur exists only at the point where the temperature is intentionally lowered and the product sulfur crystals are produced (solid sulfur is not present elsewhere as the temperature is elevated, which keeps the sulfur dissolved in solution), thus avoiding plugging and the like, and providing a very operable and reliable process. Where the liquor is water insoluble, byproduct sulfur salts in this process can be easily separated by water washing the solution since they will migrate to the water and the water is insoluble in the organic solvent. The sulfur formed by crystallization in the nonaqueous environment is large (50 microns or more), does not stick, and settles easily. The solution contains no metal ions (unless added for enhanced operation), chelants, surfactants or other additives, thus eliminating the difficulties generated by the prior art use of metal chelants. And finally, the sulfur crystals produced by this process are yielded at a point and in a manner that they are not in contact with water or other contaminants. Any residual traces of organic solvent on the sulfur crystals are easily removed with a solvent wash loop, thus eliminating the problem of wet, contaminated sulfur. In laboratory testing, sulfur formed in bench runs where tetralin was the solvent was vacuum filtered to give 10% solvent on sulfur, and then washed with three volumes of methanol to produce a teltalin-free sulfur product with 0.5 weight percent methanol, which can be easily removed and recovered to yield a pure sulfur product.

In the present invention the initial reaction is between dissolved sulfur and $H_2S$, not (as in much of the prior art) between $H_2S$ and a metal ion. Some of the reactions are catalyzed by the presence of an organic base and occur in the presence of a polysulfide oil solubilizer. Removing the solubilizer can cause a polysulfide oil layer to form. Neither of these constraints exist in an aqueous system. The reactions are carried out in a nonaqueous environment; most of the reacting species would not exist in an acceptable form/configuration in an aqueous environment. Aeration of aqueous polysulfide streams usually produces predominantly sulfur oxyanion salts, not elemental sulfur. In addition, the solution components comprising the sorbing liquor of the present process are insoluble in water. Furthermore, sulfur is formed initially in solution in the dissolved state and becomes a solid only after the solution solubility for sulfur is decreased by lowering the temperature.

BRIEF DESCRIPTION OF THE DRAWING

In the drawing appended hereto:

The FIGURE is a schematic block diagram of a system operating in accordance with the present invention.

DESCRIPTION OF PREFERRED EMBODIMENTS

In the Figure, a schematic block diagram appears of a system 20 which may be used in practice of the present invention. In a typical application of the invention, a gaseous stream 22 to be treated by the process and apparatus of the invention is a natural or other fuel gas which typically includes 0.1 volume % to 50 volume % of hydrogen sulfide, which component for environmental and other reasons is desired to be minimized in or substantially removed from the gas stream. A more common parlance in the art is to measure the degree of contamination of a gas stream sought to be treated in terms of its daily production of sulfur. When viewed in this way, the streams to be treated by the invention will generally be those that produce 0.1 to 30 tons/day of sulfur. In a representative case where input stream 22 comprises a natural gas, it is provided to system 20 at a pressure of around 1,000 p.s.i. The stream 22 is passed into and through an absorber 11 where the hydrogen sulfide is effectively removed so that the output stream 24 is substantially free of hydrogen sulfide-typically concentrations of hydrogen sulfide in output stream 24 will be less than 4 ppm by volume.

Absorber 11 is a conventional liquid-gas contact apparatus at which the input gas stream 22 to be purified is passed in counter-current or other relation to a liquid sorbent liquor 26. Absorber 11 may for example take the form of a tower which is packed with porous bodies so as to provide a high surface area for the gas-liquid contact. Other absorber apparatus as are known in the art can similarly be utilized. Pursuant to the invention, the sorbent liquor 26 comprises a preferably nonaqueous solvent having a high solubility for sulfur, typically in the range of from about 0.05 to 2.5 g-moles of sulfur per liter of solution. Sorbent liquor 26 as provided to absorber 11 includes sulfur dissolved in the nonaqueous solvent in the range of from about 0.05 to 2.5 g-moles of sulfur per liter of solution, together with a base (such as the aforementioned tertiary amines) having sufficient strength and sufficient concentration in respect to that of the hydrogen sulfide and sulfur to drive a reaction between the sulfur and hydrogen sulfide which results in formation of one or more nonvolatile polysulfides which are soluble in the solvent. In order to provide sufficient residence time for the reactions forming the polysulfide, a reactor vessel 15 is preferably provided downstream of the absorber. This vessel can also be physically present in a delay section at the base of the absorber tower. The reactor vessel can be of conventional construction such as a plug flow reactor. Total residence time for the reaction, whether carried out in the absorber alone, in the absorber and the reactor, or in the reactor alone, can be in the range of 5 to 30 minutes, with 15 minutes or so being typical. The polysulfide remains in solution in the solvent, and the spent sorbing liquor including the dissolved polysulfide is conveyed via line 13 to a regenerator 10.

Since it is possible for certain polysulfide intermediates to separate as their concentration increases during practice of the invention (e.g., an amine-polysulfide "red oil" where the aforementioned base is a tertiary amine), a polysulfide solubilizing agent is preferably also present in sorbing liquor 26. Benzyl alcohol is a typical such solubilizing agent; however other agents such as benzhydrol, glycol, and mixtures of these several agents are suitable; and in addition the solubilizing function can be accomplished in some instances by one of the other components of the sorbent, such as the nonaqueous solvent or the base.

It is to be appreciated that the spent sorbing liquor provided to regenerator 10 is entirely provided as a liquid phase. Substantially no solid sulfur particles are present as could cause blockages or other difficulties either at the absorber or in other portions of the system proceeding regenerator 10. At regenerator 10, the sorbing liquor at a temperature in the range of 15° C. to 70° C. is oxidized by contacting with an oxygenating gas, as for example by contacting with a counter current stream of air, or other means. Typically, for example, the sorbing liquor can be contacted with an ascending upwardly sparged air stream from supply line 9, which air is at a temperature of 15° C. to 70° C. Residence time in the regenerator is typically on the order of 15 to 45 minutes, and results (in the presence of the aforementioned base) in the dissolved polysulfide being oxidized into elemental sulfur. One unexpected aspect of the invention is indeed that more than 85% conversion of the polysulfide to elemental sulfur is achieved with the surprisingly short residence times indicated.

Because of the high sulfur solubilizing characteristics of the solvent, and of the temperature of the solvent at regenerator 10, substantially no precipitation of the sulfur occurs at the regenerator, thereby continuing to avoid clogging and similar problems as often occur where slurries are developed. The sorbing liquor is thereupon discharged from the regenerator and proceeds through a line 25 to a sulfur recovery station 14. Air and water vapor are discharged from regenerator 10 at vent 27. This vent stream will likely be of acceptable environmental quality, but can be catalytically combusted if it contains large amounts of benzene or other volatile organic compound contaminant sorbed from the inlet gas.

At or just prior to recovery station 14, the sorbing liquor is cooled to a sufficiently low temperature to enable solid sulfur to be precipitated. The sorbing liquor discharged from regenerator 10 will typically have a temperature between 15° to 70° C. This temperature is reduced as the sorbing liquor proceeds through line 25 but does not reach a temperature at which sulfur precipitation occurs until it approaches or reaches station 14. In any event, station 14 may comprise a cooling means such as by refrigeration or heat exchange, with the objective of reducing the temperature of the sorbent to that needed to precipitate enough sulfur to balance for the sulfur being added to the sorbent by the hydrogen sulfide. The precipitated sulfur, as it is formed from a nonaqueous solvent, generally has a larger crystal size and a higher purity and better handling characteristics than such properties for sulfur precipitated from aqueous solution. The precipitated sulfur is separated from the sorbent by separating means which form part of recovery station 14 or which can be immediately downstream of station 14. Separation can be accomplished by filtration, and/or settling and/or by centrifugation, and the now regenerated sorbent is recycled to the absorber 11 for reuse in the cycle.

The recovered sulfur at station 14 can be purified at a sulfur purification station 18. Residual traces of organic solvent on the sulfur crystals are removed with a solvent wash loop. Methanol can be used for such purpose, and can be recovered, distilled off and recycled in the loop. Pumps 12 and 17 are shown positioned in the system 20 to enable circulation of the sorbent in the manner shown-these and/or other pumps can be otherwise situated within the system to sustain the desired circulation. A heating station 16 can be provided between recovery station 14 and absorber 11 to bring the sorbent back to a temperature appropriate for dissolution of the sulfur that remains with the sorbent as it is returned to absorber 11. Supplemental heating means can also be provided at other points in the system to assure that the temperature remains above the sulfur precipitation point, i.e., until the sorbing liquor reaches the point in its circulation where such precipitation is desired. A byproduct sulfur salts removal step may also be employed, as shown for example in station 19. If the sorbing liquor is insoluble in water, then a water or aqueous alkalai wash followed by disposal of the aqueous phase or by removal of the salts from the aqueous phase by crystallization, or other means can be used for this purpose.

The invention is further illustrated by the following Examples, which however are to be considered as exemplary, and not delimitative of the invention which is otherwise set forth:

EXAMPLE 1

In this Example a system similar to that shown in the Figure was utilized, except that no cooling of the liquid stream from regenerator 10 was used, and no reaction vessel was used between the $H_2S$ absorber and the regenerator. The objective was not to crystallize the sulfur but rather to merely demonstrate the effectiveness of the basic reactions used in the process. Accordingly an $H_2S$-containing gaseous stream was contacted in the absorber 11 with a nonaqueous solvent material comprising 65% (v/v) tetralin (1,2,3,4 tetrahydronaphthalene), which has a high solubility for sulfur and a high boiling point, 15% (v/v) of a base, 2-(dibutylamino) ethanol, and 20% (v/v) benzyl alcohol. The benzyl alcohol, which also has a high boiling point, eliminates the formation of a heavy red "oil" which may be an amine-polysulfide "salt." The $H_2S$ absorber was a 1.0 inch diameter column fitted with a 13-inch tall bed of 5 mm Raschig rings. The bed was wet with sorbent from the top. $H_2S$-containing gas entered from the bottom. The oxidizer was a bubble column of 24-inch working height holding 840 mL of fluid. Using 1.0 L of this solvent formulation at a liquid flow rate of 20 cc/minute, the system was operated continuously for eight hours while absorbing $H_2S$ from a gas containing 18% $H_2S$ (balance nitrogen) flowing at 100 cc/minute. The outlet concentration of $H_2S$ from the absorber decreased during the run from a high of 65 ppm to a steady volume of 21±2 ppm during the last three hours of the run. During this time, the sulfur concentration increased from an initial volume of 0.30M up to 0.57M and no sulfur precipitated. The temperature of the system was 24°±2° C. during the run. Air was passed into the oxidizer at 1.0 L/minute. The total alkalinity of the system changed very little, indicating that the amine base was regenerated by aeration in the air-sparged regenerator 10. A secondary release of 300±100 ppm $H_2S$ from the regenerator was noted, but the overall $H_2S$ removal was still better than 98%. The hydrogen sulfide to sulfur conversion efficiency was 73% based on an electrochemical analysis for sulfur in the sorbent solution. As noted previously, no attempt was made to crystallize the sulfur during this run.

EXAMPLE 2

This run was similar to the one described in Example 1 except that a cylindrical vessel having a volume of 200 mL was inserted between the $H_2S$ absorber and the air regeneration vessel. The system was charged with 1.2 L of a sorbent having the same chemical composition as in Example 1. The system was operated at ambient temperature (20° C.) and a liquid flow rate of 20 mL/minute. The sour gas stream characteristics were the same as in Example 1. The air flow rate to the oxidizer was lowered to 0.4 L/minute. The increased residence time (10 minutes) for reaction in the 200 mL reaction vessel produced a significant decrease in the amount of $H_2S$ stripped from the air regenerator even at the reduced air rate. The average $H_2S$ emitted from the air regenerator was 75 ppm as compared to 300 ppm $H_2S$ in Example 1, producing a decrease of about a factor of 10 in the total amount of $H_2S$ lost from the regenerator. The $H_2S$ concentration leaving the $H_2S$ absorber was also lowered to an average of about 18 ppm. Thus, the overall $H_2S$ removal efficiency was 99.8% in this case.

On continued use of this solution, a point was reached where solid sulfur began to precipitate in the solution leaving the air-sparged regenerator as the sulfur concentration reached approximately 0.8M. However, simply warming the solution from 20° C. to approximately 40° C. by directing the output of a heat gun on the regeneration vessel redissolved the sulfur and allowed the run to continue.

Thus, it is apparent that by lowering the temperature of the solution circulating through the system, the sulfur can be crystallized. This was done initially in a "batch" mode by placing solution drained from the continuous-running apparatus in a refrigerator at 4° C. A batch of very large (up to 0.1 inches long) yellow crystals was obtained. The yellow crystals were found to be sulfur by melting and by x-ray diffraction. The filtrate from this operation was then be used as a hydrogen sulfide sorbent for at least seven hours with no further formation of solid sulfur. Subsequent experiments demonstrated hydrogen sulfide to sulfur conversion efficiencies of at least 90% based on comparing weight changes in the hydrogen sulfide cylinder and weight of sulfur produced from solution on cooling.

EXAMPLE 3

This example describes operation of the process with continuous crystallization and removal of sulfur produced from sorption and oxidation of $H_2S$. A water-jacketed cylindrical vessel was inserted downstream of the air regenerator to act as a sulfur crystallizer (i.e. for sulfur recovery). Tap water was passed through the outer jacket to lower the temperature of the circulating liquid exiting the regenerator from 49° C. to 27° C. Another vessel was inserted downstream of the crystallizer to allow settling and separation of the sulfur crystals from the slurry exiting the crystallizer. The crystalizer was operated at a liquid volume of 650 mL and the separator was operated at a liquid volume of 500 mL. The liquid flow rate was 20 mL/minute. The 200 mL cylindrical reaction vessel was replaced with a 15-foot long tube with a volume of 150 mL. The $H_2S$ concentration was 15.7%, and the total sour gas flow was again 100 mL/minute. The air flow rate to the regenerator was 600 mL/minute.

The sorbent consisted of 60% (v/v) of Therminol® 59 solvent (a mixture of alkyl diarylethanes supplied by Monsanto Company), 15% (v/v) of Polycat® 12 (consisting primarily of N-methyldicyclohexylamine supplies by Air Products and Chemicals, Inc.), and 25% (v/v) of benzyl alcohol with an average elemental sulfur concentration during the run of 0.51M.

The process was operated for 28.8 hours with an average outlet concentration of $H_2S$ from the absorber of 7.8 ppm (99.98% removal) and an average $H_2S$ concentration out of the regenerator of 91 ppm. There was no evidence of a decrease in $H_2S$ absorption efficiency during the run. Based on extraction and analysis of the circulating sorbent, the average total sulfur converted to sulfate was 11.7%, and the average total sulfur converted to thiosulfate was 4.1%. The physical handling and settling properties of the sulfur formed throughout the run were excellent. The crystal size of the product sulfur was greater than 50 micron as measured by scanning electron microscopy.

It is apparent from the foregoing that the process and system of the present invention overcomes the sulfur handling problems of the prior art aqueous liquid redox sulfur recovery processes. At the same time, because the reactants, sulfur and base, are highly soluble in the circulating solution, the process provides a large capacity for hydrogen sulfide absorption, thus permitting low circulation rates and consequently small equipment sizes for both the hydrogen sulfide absorber and the solution regenerator. Low circulation rates are also important in reducing the pumping energy needed to operate a hydrogen sulfide absorber at high pressures, as, for example, for direct treatment of high-pressure natural gas. The efficiencies for simple air regeneration are unexpectedly high and the rates of the air oxidation reaction are unexpectedly fast. While the present invention has been set forth in terms of specific embodiments thereof, it will be evident in the light of the present disclosure that numerous variations upon the invention are now enabled to those skilled in the art, which variations will yet reside within the present teachings. Accordingly, the invention is to be broadly construed, and limited only by the scope and spirit of the claims now appended hereto.

What is claimed is:

1. A system for removing $H_2S$ from a gaseous stream, comprising:

absorber means for receiving and contacting the $H_2S$-containing gaseous stream with a sorbing liquor comprising a nonaqueous solvent containing dissolved sulfur, and a base having sufficient strength and concentration to drive the reaction converting $H_2S$ sorbed by said liquor to a nonvolatile polysulfide which is soluble in the sorbing liquor;

regenerator means downstream of said absorber means for oxidizing said sorbing liquor containing the dissolved polysulfide to convert said polysulfide to sulfur which remains dissolved in said liquor;

sulfur conversion means downstream of said regenerator means for converting at least part of said dissolved sulfur to solid particulate sulfur; and separating and recycling means downstream of said regenerator means for separating said solid sulfur from the liquor and returning the regenerated liquor to said absorber means for recycling.

2. A system in accordance with claim 1, wherein said sulfur conversion means includes means for cooling the sorbing liquor, following oxidation of said polysulfide to sulfur, to a temperature at which solid sulfur particles precipitate.

3. A system in accordance with claim 1, further including a reaction chamber between said absorber means and said regenerator means, for increasing the residence time for said reaction converting said $H_2S$ to said polysulfide.

4. A system in accordance with claim 1, further including means for purifying said precipitated sulfur.

5. A system in accordance with claim 1, wherein said purifying means comprises a washing loop for removing residual traces of said nonaqueous solvent from said sulfur by washing the sulfur with methanol; said loop including distillation means for recovering the methanol for recycling.

6. A system in accordance with claim 1, wherein byproduct sulfur salts are removed from the nonaqueous solvent, when said solvent is water insoluble, by water or aqueous alkalai washing said solvent.

* * * * *